Feb. 27, 1923.
F. A. KOLSTER
RADIO METHOD AND APPARATUS
Filed Jan. 30, 1919
1,447,165
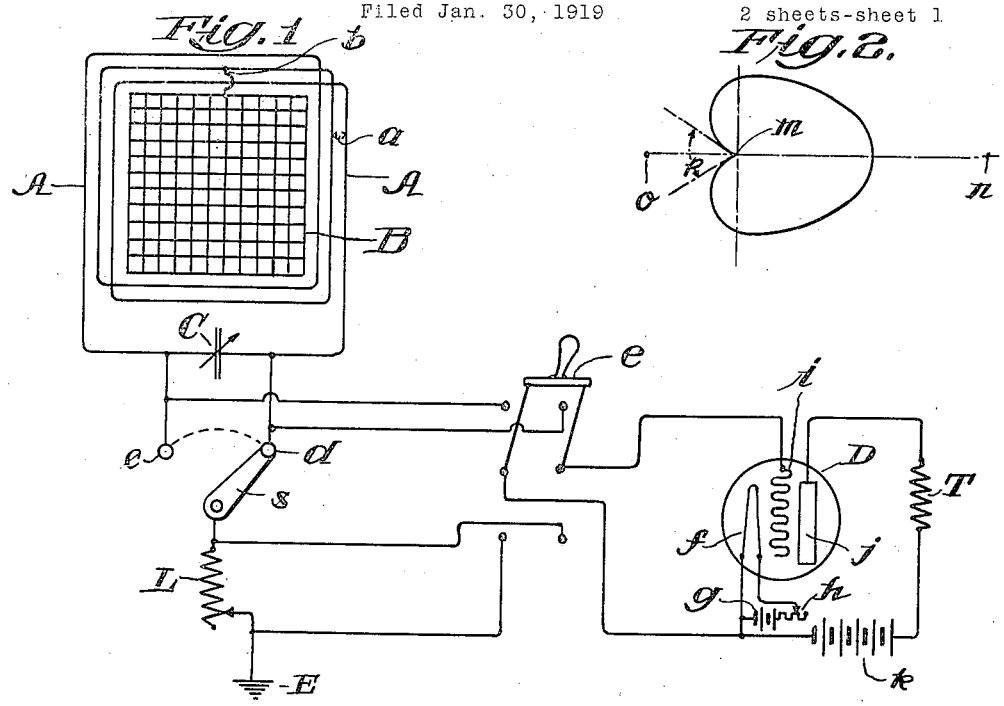
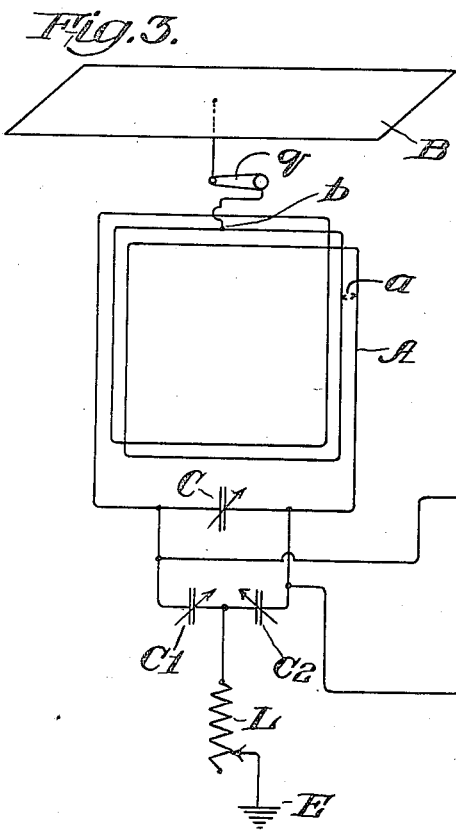
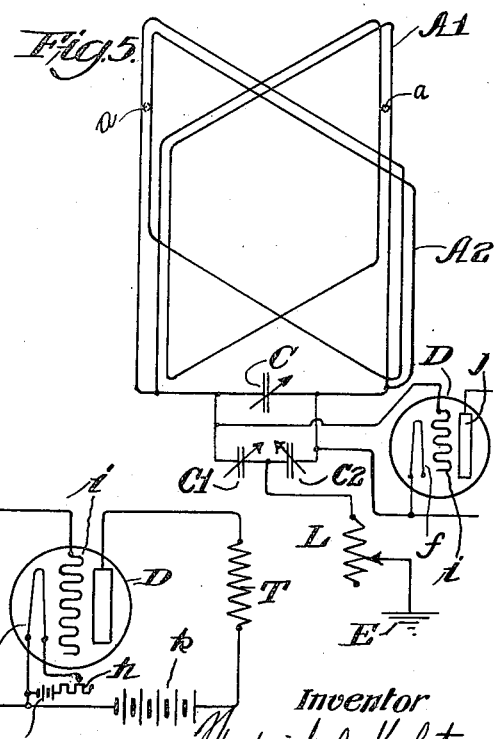
Inventor
Frederick A. Kolster
By Cornelius D. Ehret
his Attorney

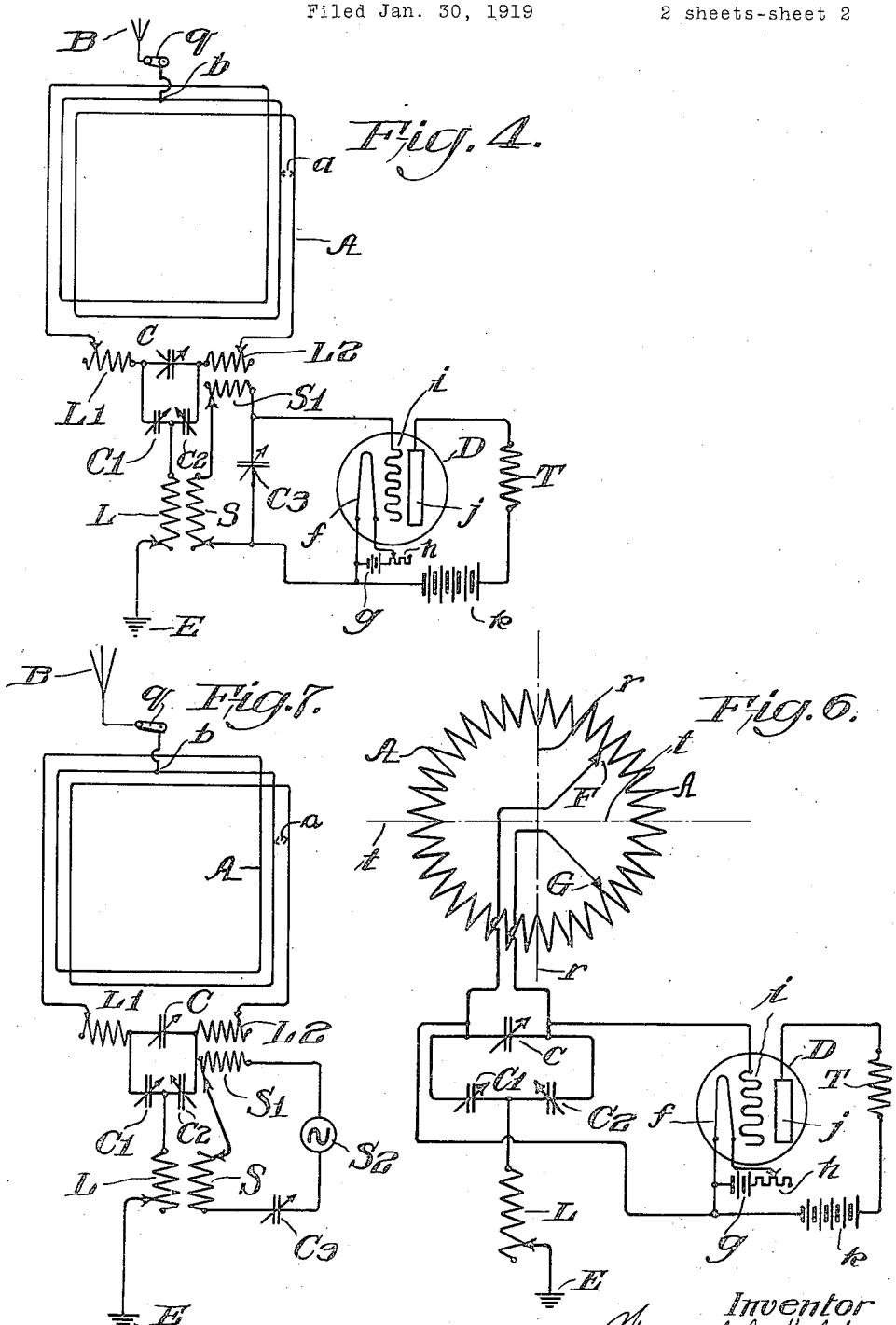

Patented Feb. 27, 1923.

1,447,165

UNITED STATES PATENT OFFICE.

FREDERICK A. KOLSTER, OF WASHINGTON, DISTRICT OF COLUMBIA.

RADIO METHOD AND APPARATUS.

Application filed January 30, 1919. Serial No. 274,054.

*To all whom it may concern:*

Be it known that I, FREDERICK A. KOLSTER, a citizen of the United States, residing at Washington, District of Columbia, have invented a new and useful Radio Method and Apparatus, of which the following is a specification.

My invention relates to apparatus for transmitting or receiving electro-radiant energy or electro-magnetic waves for the transmission of intelligence, as for telegraphy or telephony, or for signaling in general, or for any other purpose.

My invention resides in apparatus of the character referred to comprising a closed circuit whose distributed capacity and inductance are preferably very small or substantially nil, the closed circuit, and particularly the inductance or coil therein, operating as a capacity area connected through tuning apparatus, as variable inductance, with the earth or any counterpoise capacity.

Receiving apparatus embodying my invention is an absolute direction finder or a true radio compass whereby the location of a source of radiant energy may be determined. Such receiving apparatus serves also as an excellent interference preventer, that is, for permitting reception of signals from a desired station to the exclusion of signals from other stations differently located with respect to the receiving station, and to the exclusion of atmospheric or natural electrical effects.

Transmitting apparatus embodying my invention has the property of not only transmitting energy of greater intensity in some directions than others, but has also the property of causing transmission of energy of great intensity in a desired direction, and no or practically no energy in opposite direction.

My invention resides in the methods and apparatus of the characters hereinafter described and claimed.

For an illustration of some of the various modes of practicing my methods and of various forms my apparatus may take, reference is to be had to the accompanying drawings, in which:

Fig. 1 is a diagrammatic view of apparatus embodying my invention.

Fig. 2 is a graphic representation of relative intensities of received or transmitted energies as they exist in different directions with respect to the location of the transmitting or receiving apparatus.

Figs. 3, 4, 5 and 6 are diagrammatic views of modified apparatus embodying my invention.

Fig. 7 is a diagrammatic view of one of various forms of transmitting apparatus embodying my invention.

Referring to Fig. 1, A is a coil of one or more turns constituting a lumped inductance connected in series with the variable tuning condenser C. The distributed inductance and distributed capacity of this closed circuit are preferably substantially nil. The closed circuit, and particularly the coil A thereof, constitutes a capacity area operating as a capacity or structure whose distributed capacity and distributed inductance are preferably small or substantially nil. The coil capacity area A is connected from either side of the condenser C through switch contacts $c$, $d$ and switch $s$ through the adjustable or tuning inductance L to earth E or any counterpoise or other capacity area as the metal parts or frame of aircraft; or where a good earth connection is not obtainable, E may be a grid or area of metal spread upon or embedded in the earth. A double pole double throw switch $e$ connects the detector D either across the condenser C or in shunt to the inductance L. The detector D may be of any suitable character, and is, in the preferred example illustrated, a thermionic detector comprising the incandescent filament $f$, in circuit with the battery $g$ and the adjustable resistance $h$, the grid $i$ and the wing, plate or anode $j$, in whose circuit is a suitable source of current, as battery $k$, and the winding T, which may be that of a telephone instrument or the primary winding of a transformer communicating with or to one or more further thermionic devices for further amplification to any suitable degree, any suitable mode of reception, as beat reception, being contemplated by my invention.

To ensure that the coil A shall have, as a coil, minimum distributed capacity and yet, as a capacity area, a maximum or large capacity with respect to earth or other capacity E, the coil may have its neighboring convolutions or turns separated from each other by a suitable or considerable space $a$, whereby the distributed capacity effect due to capacity between neighboring turns or convolutions is reduced to a negligible amount or is substantially nil.

The coil A may be, though it is not necessarily, associated with a capacity area, as B, in this instance shown, as one example, as a grid or network of wire or metal connected at $b$ to the coil A preferably at or near its middle point.

The connection from the coil structure to earth through the variable inductance L may be considered as part of an antenna structure. Considering the coil A and the condenser C as a separate or independent system, reception is greatest in the plane of the coil A and a minimum in a direction at right angles or normal to the direction for maximum effect. By the coaction of the closed circuit A, C and the system similar to an antenna structure comprising the coil A as a capacity area, with its connection to earth through inductance L, a composite system results which has a unilateral characteristic in that energy is received far more readily from a given direction, without effect by stations or atmospheric effects lying in different directions.

The uni-lateral characteristic, both for reception and transmission, is illustrated by Fig. 2, wherein $m$ indicates the location of my apparatus. The curve, more or less heart-shaped, that is, corresponding more or less with a cardioid, indicates by distances measured from the point $m$ to any point on the curve the relative intensity of the energy radiated in or received from that direction. Assuming the apparatus to be used as a transmitter, for example of the character disclosed in Fig. 7 hereof, or any equivalent apparatus, and to be located at $m$, if it is desired to transmit to a station located in the direction of $n$, the plane of the coil is brought to such position that it points in the direction of $n$. The combined effect of the closed coil system with the aerial structure or system comprising the coil as a capacity area with a connection to earth, is such that a maximum amount of energy will be transmitted towards $n$, with diminishing amounts in all other directions, and in the direction of $o$ practically no energy is transmitted. In fact, substantially no energy is transmitted throughout the substantial angle $p$. If, however, it is desired to transmit in the direction of $o$ to the exclusion of transmission in the direction of $n$, the coil structure may be rotated through 180 degrees or, in a transmitting system embodying structure like that indicated in Fig. 1, the switch $s$ is shifted from one of the contacts $c$, $d$ to the other.

Where receiving apparatus such as herein described is located at $m$, stations in the directions of both $n$ and $o$ may simultaneously be in operation, even with the same wave length, and if it is desired to receive from station $n$ only, interference by station $o$ is prevented by bringing the plane of the coil A into position to point at station $n$, the coil circuit and the antenna structure or path both being attuned to the frequency of the energy from station $n$. In such case, any effects by station $o$, or in fact any station within the angle $p$, is more or less completely prevented, and is entirely preventable if the station $o$ or the stations within the angle $p$ are not very close to $m$.

Considering the receiving apparatus of Fig. 1 located at $m$, by throwing the switch $e$ downwardly to bring the detector D in shunt to the inductance L, and with switch $s$ on either $c$ or $d$, there is substantially no directional effect, and this position of the apparatus is employed to determine whether any station is sending or whether, for example, the station of $n$ is sending. The inductance L is adjusted for maximum response in the detector circuits, which means suitably tuning to the wave length of the station at $n$.

Then with the switch $s$ open, that is, on neither $c$ nor $d$, and with the switch $e$ thrown upwardly to bring detector D in shunt to the condenser C, that condenser is adjusted to attune the closed circuit A, C to the energy transmitted by station $n$. The coil A is rotated about a vertical axis to such position that maximum response to station $n$ is produced, the vertical plane of the coil in such case pointing in the direction of $n$; or to such position that the response is a minimum or zero, in which case the plane of the coil A is normal to the direction of station $n$. The coil A is then left in position with its plane in the direction of the station $n$, if maximum response was utilized, or is turned from normal position, if zero or minimum response was utilized, to position with its plane in the direction of the station $n$. The switch $s$ is then thrown on to either $c$ or $d$. With the switch $s$ in such position, the tuned antenna path including the inductance L, being connected to the one side or the other of the condenser C, is unsymmetrical with respect to the closed tuned circuit including the coil A; that is, the point or points of connection of the antenna path to the closed tuned circuit is or are so electrically positioned that the amount, electrically speaking, of the closed tuned path to one side of such point or points is unequal to the amount on the opposite side of such point or points, whereby the tuned antenna path and the tuned closed circuit are unsymmetrical and unbalanced with respect to each other. Because of such asymmetry or unbalance some of the oscillatory energy received from the station $n$ and surging in the antenna path is transferred, in suitable amount into the closed tuned circuit including coil A, where it co-acts with the energy received directly from the station *n* in the closed tuned circuit in affecting the detector D. Or, vice versa, because of such unbalance, some of the energy surging in the closed circuit is transferred to the antenna path; the transfer of energy as regards its effect upon the detector, being from the antenna path to the closed circuit, or, vice versa, depending upon with which of the two the detector structure is associated, the detector being associated with one or the other depending upon the position of the switch *e*. If switch *s* is on *c*, for example, it may be that no response at all is heard in the receiving telephone or other instrument, because the energy transferred to the tuned closed circuit from the tuned antenna path is equal and opposite to the energy in the tuned closed circuit. In such case the switch is thrown over to *d*, in which case the maximum effect from station *n* will be produced in the telephone or other instrument, because now the energy transferred from the antenna path to the closed circuit operates cumulatively with the energy in the closed circuit; and the sense of direction in addition to the plane of direction or bearing of station *n* becomes known due to the uni-lateral effect, that is, it becomes known that the station *n* is at the right, and not to the left of station *m*. The effects by other stations located to the left of *m* and within the angle *p* will not affect the receiving apparatus; and the effects from other stations through the remainder of a circumference exclusive of the angle *p*, even if sending with the same wave length as *n*, will be represented as to their respective magnitudes by the distances from *m* to the respective points on the cardioid curve on straight lines from *m* to those stations.

If the apparatus of Fig. 1 is to be employed as a direction finder, switch *s* may be placed on either *c* or *d*, the switch *e* is thrown down to its lower position, in which the detector is in shunt to the inductance L, and that inductance is adjusted to tune the apparatus to the wave length of the station whose direction is to be determined. Then with switch *s* open, and the switch *e* thrown to its upper position, condenser C is adjusted to attune the closed circuit to the wave length of the station whose direction is to be found. Then the coil A is rotated until minimum or no response is made by the telephone or other receiving instrument. The vertical plane of the coil A is then normal to the direction of the sending station. The coil A is then rotated through 90 degrees, in which case its plane is pointing more or less accurately at the sending station. Then the switch *s* is thrown on either *c* or *d*, one or the other of which positions will give a loud response, while with the switch on the other contact there will be no or substantially no response. The switch *s* is then left on that contact which gives the greater response. The coil A is then with greater nicety turned to position of maximum response, and it will then be known that the plane of the coil A is pointing with great accuracy at the sending station and, in addition, that the sending station is on that side of the coil, as to the right in Fig. 1, corresponding with that side of the condenser C to which the switch *s* connects. Thus, the position of the switch S gives the absolute direction of the station when maximum response is obtained by using both the closed tuned circuit and the aerial to earth circuit, both attuned to the sending station.

In Fig. 3 the coil A, which may be rotatable and preferably having the characteristics of the coil A of Fig. 1, is in closed circuit with the adjustable tuning condenser C as before. Connected in series with each other and in parallel to the condenser C are the balancing or auxiliary condensers $C^1$ and $C^2$, both adjustable, and preferably adjustable in opposite senses, that is, as the capacity of $C^1$ increases the capacity of $C^2$ decreases. And for this purpose the movable elements of the two condensers may be mechanically connected and mechanically operated in unison for this purpose of varying one condenser in opposite sense and in proper complementary relation to the other. From a point between the balancing or auxiliary condensers a connection is made to earth or other capacity E through the adjustable inductance L. In this case the detector D, again preferably an audion or thermionic detector, which may be the first of a series of amplifying tubes, has the grid-filament circuit connected across the condenser C.

If suitable or desirable, there may be connected at point *b*, preferably at or near the middle of the coil A, a switch *q* to connect the point *b* to any suitable capacity area, as B, of any suitable character, which may be, if desired, elevated above the coil A.

The closed circuit A, C is attuned to the wave length of the station whose direction is to be determined or whose messages it is desired to receive to exclusion of messages from other stations and the antenna path, comprising the coil A as a capacity area (together with the capacity area B, if used) and inductance L, is also attuned by adjustment of inductance L to that wave length. Or more accurately speaking, the condenser C, in combination with $C^1$ and $C^2$, are adjusted to tune the closed circuit to the wave length of the sending station. That is, the tuning capacity of the closed circuit is the capacity of C plus the capacity effect of the two condensers $C^1$ and $C^2$ in series with each other. By the employment of these two extra condensers an earth connection to the system is symmetrical with respect to both sides or all parts of the closed circuit including coil A.

Structure of the character described in Fig. 3 has the sharply defined uni-lateral selectivity, direction finding and interference preventing properties, based upon the principles described in connection with Fig. 1.

The absolute direction finding property is in this case not dependent upon the position of a switch, as $s$ in Fig. 1, but is determinable by the direction of adjustment of either of the auxiliary or balancing condensers $C^1$, $C^2$ necessary to procure the maximum or minimum response in the telephone or other receiving instrument when the detector D is simultaneously subjected to both the closed coil circuit and the antenna path. The mode of procedure is similar to that described in connection with Fig. 1, in that the closed circuit including the coil A is tuned to the frequency of the energy from the station whose direction is to be found, and the coil A moved to such position that the effect upon the detector D and response in the telephone T are a maximum, in which case the vertical plane of the coil A points in the direction of the distant station; or the coil A may be so positioned that the response in the telephone T is zero or a minimum, in which case the vertical plane of the coil is normal to the direction of the distant station. For so tuning the closed circuit, the condenser C is adjusted, and to render the closed circuit symmetrical with respect to the antenna path so that the antenna path shall have no effect upon the detector D, the condensers $C^1$ and $C^2$ are complementarily varied to effect symmetry between the closed circuit and the antenna path, the complementary variation of condensers $C^1$ and $C^2$ having little or no effect upon the tuning of the closed circuit. When the antenna path has no effect upon the detector D, the relation is that corresponding with the switch $s$ of Fig. 1 in open position. To this end the capacities $C^1$ and $C^2$ are adjusted to such values that the point between them to which the inductance L is connected is electrically symmetrical with respect to both halves of the closed circuit on opposite sides of such point; and if the capacity area B be simultaneously employed, the aforesaid point between capacities $C^1$ and $C^2$ and point $b$ are both electrically symmetrical with both halves of the closed circuit on opposite sides of them. Having so tuned the closed circuit with the antenna path electrically symmetrical with respect thereto, whereby no energy from the antenna path has been impressed upon the closed tuned circuit, the antenna path itself is now attuned to the frequency of energy from the station $n$, as by suitably adjusting the inductance L, the auxiliary condensers $C^1$ and $C^2$ at the same time being adjusted to such capacity values that there is dissymmetry between the antenna circuit and the closed tuned circuit in order that energy transferred from the antenna path to the closed circuit may affect the detector D and telephone T. With such tuning of the antenna path accomplished, the condensers $C^1$ and $C^2$ may be further adjusted, with continuing asymmetry between antenna path and closed circuit, to either increase or decrease the effect upon the telephone T by changing the magnitude of asymmetry as between the antenna path and the closed tuned circuit. Thus, increasing the capacity of the condenser $C^1$ and simultaneously decreasing that of $C^2$, their combined effect upon the tuning of the closed circuit including coil A however remaining the same, may result in increasing the response in the telephone T, and this may be carried to a point where response of the telephone T is a maximum. But since it is more difficult to judge a maximum than a minimum, it is preferred that these balancing condensers be adjusted in sense opposite to that above described, whereby eventually the energy transferred from the antenna path into the closed circuit will be substantially equal and opposite to that in the closed circuit, whereby the response in the telephone T is a minimum or zero, which is easily recognizable and with accuracy determinable. Accordingly the sense of adjustment of the condensers $C^1$ and $C^2$ necessary for a critical response of telephone T determines whether the station $n$ be to the right or to the left of the receiving station at $m$. Or, with the condensers $C^1$ and $C^2$ in such position that a maximum response is had in the telephone T by rotating the coil A 180 degrees to produce a minimum or zero response in the telephone T, the absolute direction of the station $n$ becomes known, one vertical side of the coil A having previously been determined as the pointing side. Accordingly the condensers $C^1$ and $C^2$, while not disturbing the resonance or tuning of the closed circuit, cause either cumulative or differential effects of the energies in the antenna path and closed circuit upon the detector D just as the switch $s$ of Fig. 1 accomplishes similar effect by engaging the terminals $c$ and $d$. By the arrangement of Fig. 3 the shift or change from cummulative to opposing effect is variable and capable of nicety of control, whereas in Fig. 1 the change is abrupt.

From the foregoing it will be understood that the coil A and its closed circuit alone are utilized for determining bearing, and that the antenna path is utilized when true sense of direction of the source of electro-radiant energy is to be determined. The antenna path is made operative or inoperative either by opening or closing it by a switch, as $s$, Fig. 1, or, as indicated in Fig. 3 and others, by detuning it, as by adjusting the inductance L to a value which renders the antenna path non-resonant with the frequency of the energy received.

Structure of the character illustrated in Fig. 3, whether or not using the auxiliary capacity area B, is my preferred structure when used in receiving energy whose wave length ranges upwardly to 3000 meters, more or less, for which purpose the coil A may, by way of example, range from say 2 feet square upwardly to, say, 6 or 8 feet square, the coil A having a number of turns ranging from about 5 to 20 for short waves of approximately 3000 meters or less, or from about 30 to about 50 turns for long waves from about 3000 meters upwardly to 20,000 meters, more or less, the larger sized coils, as 6 or 8 feet square, being preferable for the longer wave lengths. These sizes of coils indicate clearly that the maximum dimension of a coil, as diameter or length of side, is a very small fraction of the wave length received therewith.

For receiving the longer waves, as for example, from about 3000 meters upwardly, an arrangement such as shown in Fig. 4 may be found preferable, due to the inductive coupling between the detector or receiver circuit and the coil and antenna systems.

In Fig. 4 the coil A is of the character hereinbefore described and is preferably rotatable. Its terminals connect through adjustable lumped inductances $L^1$ and $L^2$ to the variable condenser C in shunt to which are the auxiliary condensers $C^1$ and $C^2$, as in Fig. 3. A connection to earth or other capacity E is again provided through the adjustable inductance L connecting to a point between the balancing or auxiliary condensers $C^1$, $C^2$. In inductive relation to the inductance L is the adjustable oscillation transformer secondary S, and in inductive relation to the inductance $L^2$ is the adjustable oscillation transformer secondary $S^1$, these two secondaries being connected in circuit with the tuning condenser $C^3$ across whose terminals may be connected the grid-filament circuit of the detector D.

The symmetry afforded by the condensers $C^1$, $C^2$ is not disturbed by the inductive couplings, because of the introduction of the adjustable inductance $L^1$ to balance the necessary inductance $L^2$ for one of the inductive couplings. In this case the inductances $L^1$, $L^2$ and condensers C, $C^1$ and $C^2$ are adjusted to attune the closed circuit including the coil A to the desired wave length. As before, the inductance L is adjusted for tuning the antenna structure or system, including the coil A (and the additional capacity area B if used) to the desired wave length.

The secondary circuit is also attuned to the desired wave length by suitably adjusting the windings S, $S^1$ and the condenser $C^3$.

In this case again an additional capacity area B, as an ordinary wire or antenna capacity area, may be connected through switch $q$ to the point $b$, preferably at or near the middle of the coil A.

Since the detector D receives energy directly from the antenna path through the coupling LS, the adjustment of the condensers $C^1$, $C^2$ may remain that which establishes symmetry between the antenna path and the closed tuned circuit. However, with the condensers $C^1$ and $C^2$ so adjusted, as described in connection with Fig. 3, that the antenna path is unsymmetrical with respect to the closed tuned circuit, energy will be communicated from the antenna path to the closed tuned circuit and thence through the coupling $L^2$ and $S^1$ to the detector circuit in addition to the energy transferred directly from the antenna path to the detector circuit through the coupling LS. In other words, in Fig. 4 the condensers $C^1$ and $C^2$ may be adjusted either to condition for symmetry or asymmetry between the antenna path and closed tuned circuit.

In Fig. 5 is shown an arrangement, involving the principles of Figs. 1 and 3, in which the coil structure is composed of two coil elements $A^1$ and $A^2$ having their planes at an angle with respect to each other, and rotatable either as a unit, or as regards movement of one coil with respect to the other. With these coils may be associated a capacity area or capacity areas, as B, of any of the forms or arrangements hereinbefore described. The coils $A^1$, $A^2$ are preferably connected in parallel with each other, as indicated, though it will be understood that they may also be connected in series with each other. In circuit with the coils $A^1$, $A^2$ is the variable condenser C shunted by the balancing or auxiliary condensers $C^1$, $C^2$, from between which a connection to earth or other capacity E is made through variable inductance L. As before, the detector is preferably connected across the condenser C.

In Fig. 6 is shown an arrangement involving the principles of Figs. 1 and 3, and in which coil A is a so-called toroidal coil, as by winding a conductor in and out upon the surface of a toroidal form. For example, the endless coil A may be wound inside and outside of a hollow cylinder, as in the case of a Gramme ring winding in a dynamo-electric machine, though preferably the coil A is in a single layer, and preferably without iron or magnetic core.

The coil A may comprise any suitable number of turns, and by way of example it may comprise 360 turns uniformly spaced around a circumference, whereby there is one turn per degree. Contacting with the coil A at different points are the contactors F and G, independently movable of each other and connected, respectively, to the terminals of the adjustable condenser C, in parallel with which may be connected the balancing or auxiliary condenser $C^1$, $C^2$ from a point between which there is a connection from a point between earth or capacity E to adjustable inductance L. Here again the detector D is connected across the condenser C. The toroidal coil A may be stationary, though it may be rotatable with respect to one or more of the contactors F, G if desired. Assuming it stationary, and it is desired to find the direction of a sending station, the closed circuit including the coil A and the condenser C with its balancing condensers is attuned to the wave length of that station, and similarly, the path of the antenna system or structure is so attuned by adjusting the inductance L. The contactors F and G are independently movable to such positions that the closed circuit including the coil A is suitably attuned, as stated, to the wave length of the station whose direction is to be found, the adjustment of these contactors being made such that maximum response in the telephone or other instrument is produced. In such case there are in the closed circuit two inductances, in parallel with each other, one of them being that part of the coil A within the smaller angle between the contacts F and G, and the other being the remainder of the coil A. When these adjustments for maximum response have been made, the direction of the sending station will be that of the line $r$ at right angles to the line $t$, which is the bisector of the angle between the contactors F and G.

If the contactors F and G engage the coil A at 180 degrees from each other, they will themselves be located in the line $r$ which points in the direction of the station to be located.

The contacts F, G may rotate in fixed relation with respect to each other on the coil A, always engaging the same at points 180 degrees from each other, in which case the line joining the contactors F, G will be in line with the station whose direction is to be found.

Structure of the character herein referred to may also be employed for transmitting apparatus, one of many forms of which is illustrated, by way of example, in Fig. 7. The coil A is connected in closed circuit through the adjustable inductances $L^1$ and $L^2$ with the adjustable capacity C, in shunt to which are the capacities $C^1$ and $C^2$ variable in opposite senses and from a point between which connection to earth or other capacity area E is made through the variable inductance L. In inductive relation to the inductances $L^2$ and $L$ are the adjustable oscillation transformer primaries S and $S^1$ in circuit with an adjustable capacity $C^3$, adjustment of these primaries and the capacity $C^3$ serving either to determine the natural period of the primary circuit when the oscillations are produced in that circuit, or to attune the primary circuit to the frequency of the source of oscillations $S^2$, of any suitable character, as for example, a source of sustained high frequency oscillations such as employed in radio telephony or telegraphy. The energy is controlled by any suitable signaling instrument in any suitable manner, such as well understood in the art.

The antenna system or structure may have capacity area in addition to that afforded by the coil A, as by the capacity area B of any suitable structure, as ordinary antenna wires, which may be connected through switch $q$ to the point $b$ preferably at or near the center of the coil A. This transmitting apparatus will cause oscillations not only in the antenna system, so-called, including the capacity area, as coil A, but also through the transformer $S^1$, $L^2$ in the closed circuit including the coil A, whereby a uni-lateral transmitting effect such as described in connection with Fig. 2 is procured.

While the path through the inductance L of all figures of the drawing has been referred to as an antenna path or structure, it will be understood that in effect there is from the coil A, when regarded as a capacity area, a tuned connection to earth or similar capacity, and that effects such as procured by ordinary high structure aerials now commonly known in the art are not present in my apparatus, particularly as regards the undesired distributed capacity and distributed inductance effects of such aerial structures.

As to the auxiliary or additional capacity area B hereinbefore indicated in various figures, it will be understood that the various forms indicated in the different figures may be used interchangeably in the other figures.

In Fig. 7 the principles of Figs. 1, 2 and 3 are involved, as well as those of Fig. 4. With the antenna path symmetrical with respect to the closed circuit energy is transferred to the antenna path through the coupling L and S and simultaneously to the closed circuit through coupling $L^1$ and $S^2$. With the antenna path unsymmetrical with respect to the closed circuit, as may be accomplished by suitable adjustment of condensers $C^1$ and $C^2$, which, however, as to their combined effect upon the natural period of the closed circuit remains the same as before, energy is transferred to the antenna path and closed circuit through the couplings as before, but in addition energy is transferred from the antenna path into the closed circuit due to the asymmetry between them.

Throughout the figures of the drawings, the condenser C has to do mainly or solely with the closed circuit only, for attuning it or giving to it a suitable or desired natural period; while as regards Figs. 3 to 7 inclusive, the condensers $C^1$, $C^2$ have to do with the matter of symmetry or asymmetry between the antenna path and closed circuit for coupling them to effect energy transfer from one to the other.

While I have herein referred to the coil structures A of all the figures as small, such as suitable for portability, it will be understood that my invention comprehends other and larger structures of one or more turns, either stationary or portable.

It will further be understood that as regards the closed coil circuit, more especially in receiving apparatus, the ratio of inductance to capacity is preferably large, whereby higher selectivity is procured and a higher potential available, particularly when the detector is of the thermionic or other potential operated type. A similar relation in the tuned path to earth or other capacity E may also obtain.

What I claim is:

1. The method of receiving high frequency energy, as electro-radiant energy, which consists in receiving the energy in a plurality of absorbers, one of which is a closed circuit and another a path, tuning the closed circuit to the received energy, tuning said path to the received energy, and producing an indication by energy in one of said absorbers and consisting in part of energy transferred to said one of said absorbers from another of said absorbers.

2. The method of receiving high frequency energy, as electro-radiant energy, which consists in receiving the energy in a plurality of absorbers, one of which is a closed circuit and another a path of which said closed circuit is a part, tuning the closed circuit to the received energy, tuning said path to the received energy, and producing an indication by energy in one of said absorbers and consisting in part of energy transferred to said one of said absorbers from another of said absorbers.

3. The method of receiving high frequency energy, as electro-radiant energy, which consists in receiving the energy in a plurality of absorbers, one of which is a closed circuit and another a path of which said closed circuit is a part, tuning said closed circuit and said path independently of each other without transfer of energy from one to the other, and producing an indication by energy in one of said absorbers and consisting in part of energy transferred to said one of said absorbers from another of said absorbers.

4. The method of receiving high frequency energy, which consists in receiving the energy in absorbers having, respectively, uniform and non-uniform directional characteristics, and effecting production of an indication by energy in one of said absorbers and consisting in part of energy transferred to said one of said absorbers from another of said absorbers.

5. The method of receiving high frequency energy, as electro-radiant energy, which consists in receiving the energy in a plurality of absorbers, one of which is a closed circuit and another a path of which said closed circuit is a part, tuning the closed circuit to the received energy, tuning said path to the received energy, and producing an indication by energy which is the resultant of energy in one of said absorbers opposed by energy in another of said absorbers 6. The method of receiving high frequency energy, as electro-radiant energy, which consists in receiving the energy in a plurality of absorbers, one of which is a closed circuit and another a path, tuning the closed circuit to the received energy, tuning said path to the received energy, and producing an indication by the energy in one of said absorbers opposed by energy transferred thereto from another of said absorbers.

7. The method of receiving high frequency energy, which consists in receiving the energy in a plurality of absorbers, one of which is a closed circuit having non-uniform directional characteristic and another a path having uniform directional characteristic and of which said closed circuit is a part, and effecting production of an indication by energy in one of said absorbers and consisting in part of energy transferred to said one of said absorbers from another of said absorbers.

8. The method of receiving high frequency energy, as electro-radiant energy, which consists in receiving the energy in a plurality of absorbers, one of which is a closed circuit and another a path, tuning the closed circuit to the received energy, tuning said path to the received energy, and producing an indication by minimum energy which is the resultant of the energy in one of said absorbers opposed by energy of another of said absorbers and transferred therefrom to said one of said absorbers.

9. The method of determining the sense of direction of a source of high frequency energy, as electro-radiant energy, which consists in receiving the energy upon a plurality of absorbers, one of which is a closed circuit and another a path, tuning said closed circuit and said path to the received energy, producing an indication whose magnitude depends upon the co-action of the energy in said closed circuit with the energy in said path, moving a part of said closed circuit to change the magnitude of the indication, and determining from the sense of the change of said magnitude the sense of direction of said source.

10. The method of determining the sense of direction of a source of high frequency energy, as electro-radiant energy, which consists in receiving the energy upon a plurality of absorbers, one of which is a closed circuit and another a path, tuning said closed circuit and said path to the received energy, producing an indication whose magnitude depends upon energy in one of said absorbers and co-action therewith of energy transferred to said one of said absorbers from another of said absorbers, moving a part of said closed circuit to change the magnitude of the indication, and determining from the sense of the change of said magnitude the sense of direction of said source.

11. The method of determining the sense of direction of a source of high frequency energy, as electro-radiant energy, which consists in receiving the energy upon a plurality of absorbers, one of which is a closed circuit and another a path, tuning said closed circuit and said path to the received energy, producing an indication whose magnitude is dependent upon the energy in one of said absorbers opposed by energy in another of said absorbers, moving a part of said closed circuit to change the magnitude of the indication, and determining from the sense of the change of said magnitude the sense of direction of said source.

12. The method of determining the sense of direction of a source of high frequency energy, as electro-radiant energy, which consists in receiving the energy upon a plurality of absorbers, one of which is a closed circuit and another a path, tuning said closed circuit and said path to the received energy, producing an indication dependent upon energy in one of said absorbers opposed by energy in another of said absorbers and transferred therefrom to said one of said absorbers, moving a part of said closed circuit to vary the magnitude of said indication, and determining from the sense of the change of said magnitude the sense of direction of said source.

13. The method of determining the bearing and sense of direction of a source of high frequency energy, as electro-radiant energy, which consists in receiving the energy in a plurality of absorbers, one of which is a closed circuit and another a path, tuning said closed circuit to the received energy while said closed circuit is out of energy transfer relation with respect to said path, moving a part of said closed circuit to determine the bearing of said source of energy to position producing a critical indication, varying the magnitude of co-action of the received energy in said closed circuit and in said path to vary the magnitude of an indication, and determining from the sense of variation of said magnitude the sense of direction of said source of energy.

14. The method of determining the bearing and sense of direction of a source of high frequency energy, as electro-radiant energy, which consists in receiving the energy in a plurality of absorbers, one of which is a closed circuit and another a path, tuning said closed circuit to the received energy while said closed circuit is out of energy transfer relation with respect to said path, moving a part of said closed circuit to determine the bearing of said source of energy to position producing a critical indication, varying the magnitude of co-action of the energy received in one of said absorbers and opposed by the energy received in another of said absorbers and transferred therefrom to said one of said absorbers, and determining from the sense of variation of said magnitude the sense of direction of said source of energy.

15. Apparatus of the character described comprising the combination with a closed circuit including a rotatable coil, a capacity in series therewith in said closed circuit, a plurality of variable capacities connected in series with each other and in shunt to said first named capacity, of a path including said closed circuit as a capacity area connected to a point between neighboring of said plurality of capacities.

16. Apparatus of the character described comprising the combination with a closed circuit including a coil, a capacity in series therewith in said closed circuit, a plurality of variable capacities connected in series with each other and in shunt to said first named capacity, of a path including said closed circuit as a capacity area connected to a point between neighboring of said plurality of capacities, and means for tuning said path.

17. Apparatus of the character described comprising the combination with a closed circuit including a coil effecting energy transfer directly between itself and a natural medium, a capacity in series with said coil in said closed circuit, and a plurality of capacities connected in series with each other in said closed circuit, of a path including said coil as a capacity area connected to a point between said plurality of capacities.

18. Receiving apparatus comprising the combination with a closed circuit including a coil absorbing energy directly from a natural medium, a capacity in series in said closed circuit, and a plurality of capacities connected in series with each other in said closed circuit, of a path including said coil as a capacity area connected to a point between said plurality of capacities, and wave responsive means associated with said closed circuit and through said closed circuit with said path.

19. In apparatus of the character described, the combination with a closed circuit comprising a rotatable inductance coil effecting direct energy transfer between itself and a natural medium, of a path effecting direct energy transfer between itself and a natural medium and including said coil as a capacity area.

20. Apparatus of the character described comprising a plurality of structures for effecting energy transfer between themselves and a natural medium, one of said structures comprising a closed circuit and another a path of which said closed circuit is a part, and means for effecting dissymmetry between said closed circuit and path to effect energy transfer from one to the other of them comprising a plurality of capacities connected in series with each other in said closed circuit and at least one of which is variable, said path connected to a point between said capacities.

21. In apparatus of the character described, the combination with a closed circuit all of whose inductance and capacity are lumped, of means for attuning said circuit, a path including said circuit as a capacity area and another capacity, and means for attuning said path.

22. Radio apparatus comprising the combination with a closed circuit including an inductance having a plurality of turns, of a path including said inductance as a capacity area, the turns of said inductance being spaced from each other to increase its capacity as a capacity area with respect to the counter-capacity of said path.

23. Radio apparatus comprising the combination with a closed circuit including an inductance having a plurality of turns, of a path including said inductance as a capacity area and earth, means for attuning said path and said closed circuit, the turns of said inductance being spaced to increase its capacity as a capacity area with respect to earth.

24. Radio apparatus comprising the combination with a closed circuit including a rotatable coil of a plurality of turns and tuning capacity, of a connection to earth from said coil.

25. Radio apparatus comprising the combination with a closed circuit including inductance, of a capacity area, and a connection from said capacity area to another capacity including said inductance as a capacity area.

26. Radio apparatus comprising the combination with a closed circuit including a lumped inductance of small distributed capacity and tuning capacity, of a capacity area, and a connection from said capacity area to another capacity including said inductance as a capacity area.

27. Radio apparatus comprising the combination with a closed circuit including a rotatable inductance, of a capacity area, a connection from said capacity area to earth including said inductance as a capacity area, and means for tuning said connection.

28. Radio receiving apparatus comprising a closed circuit including a coil absorbing energy directly from a natural medium, means for tuning said closed circuit, a path of which said coil is a part having substantially uniform directional receiving characteristic absorbing energy from a natural medium, and means for effecting dissymmetry between said path and closed circuit comprising reactances associated with said closed circuit, said path connected to a point between said reactances.

29. Radio apparatus comprising the combination with a closed circuit including inductance and tuning capacity, of a plurality of capacities connected in series with each other and in shunt to said first named capacity, a connection between another capacity and a point between neighboring of said plurality of capacities, and means for tuning said connection, said plurality of capacities being variable in opposite senses.

30. Radio receiving apparatus comprising the combination with a closed circuit including a rotatable coil and tuning capacity all of the capacity and inductance of said closed circuit being lumped whereby the distributed inductance and capacity of said closed circuit are substantially nil, said coil absorbing energy directly from a natural medium, of an antenna path connected to earth, said coil included in said antenna path, and wave responsive means subjected to the effects produced in said closed circuit.

31. Radio receiving apparatus comprising a plurality of structures for absorbing energy directly from a natural medium, one of said structures being an oscillation path and another being a closed circuit including a coil absorbing energy directly from a natural medium and disposed in said oscillation path, means for effecting dissymmetry between said path and closed circuit to effect energy transfer from one to the other of them comprising a plurality of reactances in said closed circuit, at least one of said reactances being variable, and indicating means simultaneously subjected to the energy absorbed by one of said absorbing structures and to energy transferred thereto from the other of said absorbing structures.

32. Radio receiving apparatus comprising the combination with a closed circuit having substantially no distributed inductance and capacity including inductance and tuning capacity, of a path including said inductance as a capacity area, wave responsive means subjected to the effects produced in said closed circuit, and an additional capacity area connected to said inductance capacity area.

33. Receiving apparatus comprising the combination with a closed circuit having substantially no distributed inductance and capacity including inductance and tuning capacity, of an oscillation path including said inductance as a capacity area, wave responsive means subjected to the effects produced in said closed circuit, and an additional capacity area connected to said inductance capacity area at substantially the middle point thereof.

34. Receiving apparatus comprising the combination with a closed circuit including inductance and tuning capacity, of wave responsive means subjected to the effects in said closed circuit, a plurality of capacities variable in opposite senses connected in series with each other and in parallel to said capacity, and a connection to earth from a point between neighboring of said plurality of capacities.

35. Radio receiving apparatus comprising a closed circuit including a rotatable coil absorbing energy directly from a natural medium, a path of which said coil is a part absorbing energy from a natural medium, indicating means, and means for subjecting said indicating means simultaneously to energy absorbed by said coil and to energy absorbed by said path and opposing the energy absorbed by said coil comprising a plurality of reactances in series with each other in said closed circuit, said path connected to a point between said reactances.

36. A radio compass system having unilateral receptivity comprising a rotatable coil of a plurality of turns, the maximum dimension of said coil being a small fraction of the length of the wave received, a path having substantially uniform directional receptivity of which said coil is a part, and wave responsive means subjected simultaneously to the effects produced in said coil and said path.

37. Receiving apparatus comprising the combination with a closed circuit including a rotatable coil of a plurality of turns and tuning capacity, of a path including said coil as a capacity area, and wave responsive means inductively coupled with said closed circuit.

38. Receiving apparatus comprising the combination with a closed circuit including a rotatable coil of a plurality of turns and tuning capacity, of a path including said coil as a capacity area, and wave responsive means inductively coupled with said path.

39. Receiving apparatus comprising the combination with a closed circuit including a rotatable coil of a plurality of turns and tuning capacity, of a path including said coil as a capacity area, and wave responsive means inductively coupled both with said path and with said closed circuit.

40. Receiving apparatus comprising the combination with a closed circuit including tuning capacity and a rotatable coil of a plurality of turns, of an oscillation path including said closed circuit as a capacity area, variable inductance for tuning said path, and wave responsive means inductively coupled with said closed circuit.

41. Receiving apparatus comprising the combination with a closed circuit including tuning capacity and a rotatable coil, of a path including said closed circuit as a capacity area, variable inductance for tuning said path, a plurality of capacities connected in series with each other and in shunt to said first named capacity, said path connected to a point between said plurality of capacities, and wave responsive means inductively coupled with said path.

42. Receiving apparatus comprising the combination with a closed circuit containing a rotatable coil absorbing energy directly from a natural medium, a tuning capacity in said closed circuit with said coil, an antenna path of which said coil is a part, and a plurality of reactances in series with each other in said closed circuit and in shunt to said tuning capacity, said antenna path connected to a point between said reactances.

43. Radio receiving apparatus comprising a closed circuit including a rotatable coil absorbing energy directly from a natural medium, an open antenna path, a coupling for effecting transfer of energy between said closed circuit and said path, and wave responsive means operatively related to said closed circuit and through said coupling with said antenna path.

44. Radio receiving apparatus comprising a closed circuit including a rotatable coil absorbing energy directly from a natural medium, an open antenna path, a coupling for effecting transfer of energy between said closed circuit and said path, and wave responsive means operatively related to said antenna path.

45. Radio receiving apparatus having unidirectional characteristic comprising a rotatable inductance coil having a plurality of turns absorbing energy directly from a natural medium, a path of which said coil is a capacity area absorbing energy directly from a natural medium with substantially uniform directional characteristic, and wave responsive means affected by said coil.

46. Radio receiving apparatus comprising a rotatable inductance coil having a plurality of turns absorbing energy directly from a natural medium, a path absorbing energy directly from a natural medium, means for effecting transfer of energy between said coil and path, and wave responsive means affected by said coil and path.

47. A radio compass comprising a rotatable coil having a plurality of turns, the maximum dimension of said coil being a small fraction of a quarter of the wave length, a capacity area, a connection from said coil to said capacity area, and wave responsive means associated with said coil.

48. A radio compass comprising a rotatable coil having a plurality of turns, the maximum dimension of said coil being a small fraction of the wave length, a capacity area, a connection from said coil to said capacity area, and wave responsive means associated with said coil and said connection and affected by one of them through the other.

49. A unilateral directive radio system comprising an antenna circuit containing uniform and non-uniform directional absorption structure serially connected.

50. A directional radio system comprising a primary circuit containing uniform and non-uniform directional absorption structure, and a secondary circuit containing non-uniform directional absorption structure.

51. The combination of a primary absorption circuit containing uniform and non-uniform directional absorption structure and a primary coupling coil all serially connected, and a secondary circuit containing a secondary coupling coil and a translating device.

52. The combination of a primary absorption circuit containing uniform and non-uniform directional absorption structure, and a primary coupling coil; and a secondary circuit containing non-uniform directional absorption structure, a secondary coupling coil, and a translating device.

53. A unilateral directive radio absorption circuit comprising absorption structure having a substantially uniform directional characteristic serially connected to absorption structure having a substantially non-uniform directional characteristic, the currents of said absorption structures having substantially equal amplitudes.

54. A unilateral directive antenna circuit comprising a plain antenna and an absorption coil serially connected, and means for varying the phase relation of the currents of said absorption coil with respect to the currents of said antenna.

55. A unilateral directive antenna circuit comprising an antenna and an absorption coil serially connected, and means for varying the phase relation and amplitude of the currents of said absorption coil with respect to the currents of said antenna.

56. A unilateral directive radio signaling system comprising in combination a plain antenna and a directive loop serially connected to earth, and means for varying the phase relation and amplitude of the currents in said loop with respect to the currents in said antenna.

57. A unilateral directive radio signaling system comprising absorption structure having a substantially uniform directional characteristic serially connected to a counter-capacity through a rotatable absorption structure having a substantially non-uniform directional characteristic.

58. A unilateral directive antenna circuit comprising two absorption structures, one having a non-uniform directional characteristic, and a counter-capacity all serially connected and means for producing in said antenna circuit currents of different phase.

59. A radio signaling system comprising a primary circuit containing uniform and non-uniform directional antenna structure, a secondary circuit containing non-uniform directional antenna structure, and means for coupling said primary circuit to said secondary circuit.

60. A radio signaling system comprising a primary circuit containing uniform and non-uniform directional antenna structure, a secondary circuit containing non-uniform directional antenna structure, and means for inductively coupling said primary circuit to said secondary circuit.

61. A directive radio signaling system comprising a primary circuit containing a non-directional antenna and a rotatable loop; a secondary circuit containing a rotatable loop, and means for coupling said primary circuit to said secondary circuit.

62. A directive radio signaling system comprising a primary circuit containing an antenna and a rotatable coil; a secondary circuit containing a rotatable coil, and means for inductively coupling said primary circuit to said secondary circuit.

In testimony whereof I have hereunto affixed my signature this 30th day of January, 1919.

FREDERICK A. KOLSTER.